United States Patent
Gea Aguilera et al.

(10) Patent No.: US 11,913,405 B2
(45) Date of Patent: Feb. 27, 2024

(54) TURBINE ENGINE WITH A FLOW SPLITTER HAVING A PROFILE WITH INCLINED SERRATIONS

(71) Applicant: Safran Aircraft Engines, Paris (FR)

(72) Inventors: Fernando Gea Aguilera, Moissy-Cramayel (FR); Matthieu Fiack, Moissy-Cramayel (FR); Mathieu Simon Paul Gruber, Moissy-Cramayel (FR)

(73) Assignee: Safran Aircraft Engines, Paris (FR)

( * ) Notice: Subject to any disclaimer, the term of this patent is extended or adjusted under 35 U.S.C. 154(b) by 0 days.

(21) Appl. No.: 18/183,232

(22) Filed: Mar. 14, 2023

(65) Prior Publication Data
US 2023/0213000 A1    Jul. 6, 2023

Related U.S. Application Data

(63) Continuation of application No. 16/969,630, filed as application No. PCT/FR2019/050349 on Feb. 15, 2019, now Pat. No. 11,629,664.

(30) Foreign Application Priority Data

Feb. 16, 2018 (FR) ...................................... 1851359

(51) Int. Cl.
*F02K 1/00* (2006.01)
*F02K 1/38* (2006.01)
*F02C 7/045* (2006.01)
*F02C 7/042* (2006.01)
*F02K 1/48* (2006.01)
*F15D 1/00* (2006.01)

(52) U.S. Cl.
CPC .............. *F02K 1/386* (2013.01); *F02C 7/042* (2013.01); *F02C 7/045* (2013.01); *F02K 1/48* (2013.01); *F05D 2220/323* (2013.01); *F05D 2250/183* (2013.01); *F05D 2250/61* (2013.01); *F05D 2260/96* (2013.01); *F15D 1/004* (2013.01); *F15D 1/0035* (2013.01)

(58) Field of Classification Search
CPC ... F02K 1/386; F02K 1/46; F02K 1/48; F02C 7/045; F02C 7/042
See application file for complete search history.

(56) References Cited

U.S. PATENT DOCUMENTS

| | | | |
|---|---|---|---|
| 1,862,827 | A | 6/1932 | Parsons et al. |
| 3,403,893 | A | 10/1968 | Stoffer |
| 2017/0022820 | A1 | 1/2017 | Joseph |
| 2017/0184053 | A1 | 6/2017 | Harvey |

FOREIGN PATENT DOCUMENTS

| | | |
|---|---|---|
| CN | 101716995 A | 6/2010 |
| EP | 1 496 238 A1 | 1/2005 |

*Primary Examiner* — Katheryn A Malatek
(74) *Attorney, Agent, or Firm* — Blank Rome LLP

(57) ABSTRACT

An airflow profile structure having a leading and/or trailing edge profiled with a serrated profile having a succession of teeth and depressions. Along the leading and/or trailing edge, from a first location to a second location, the teeth of the serrated profile are individually inclined towards the second location.

13 Claims, 3 Drawing Sheets

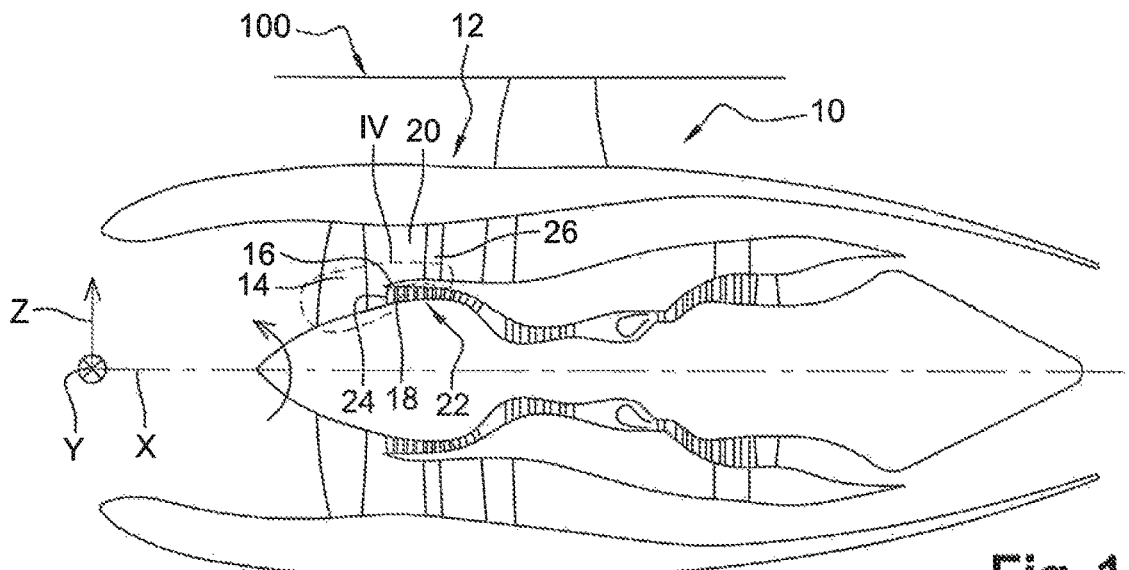
Fig. 1
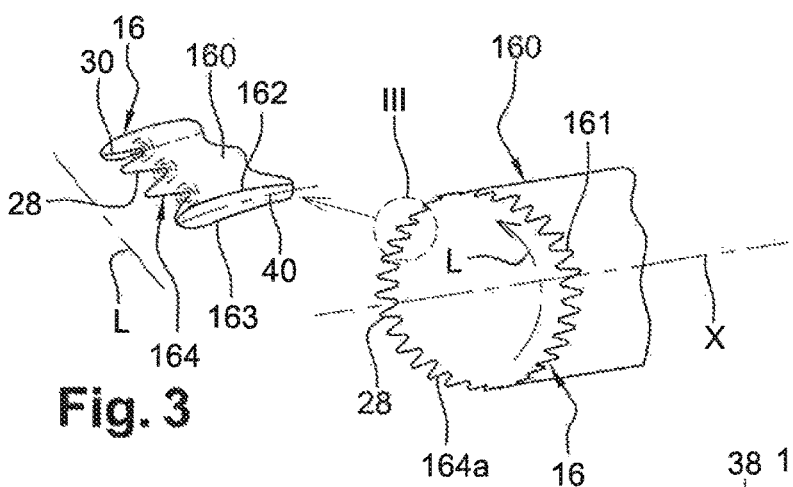
Fig. 3
Fig. 2
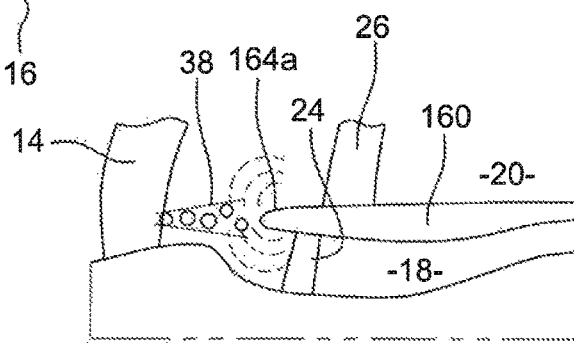
Fig. 4
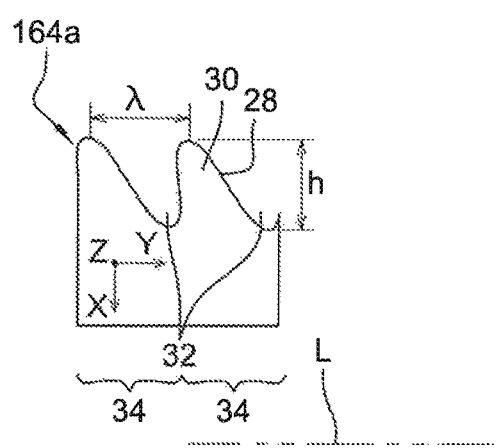
Fig. 5

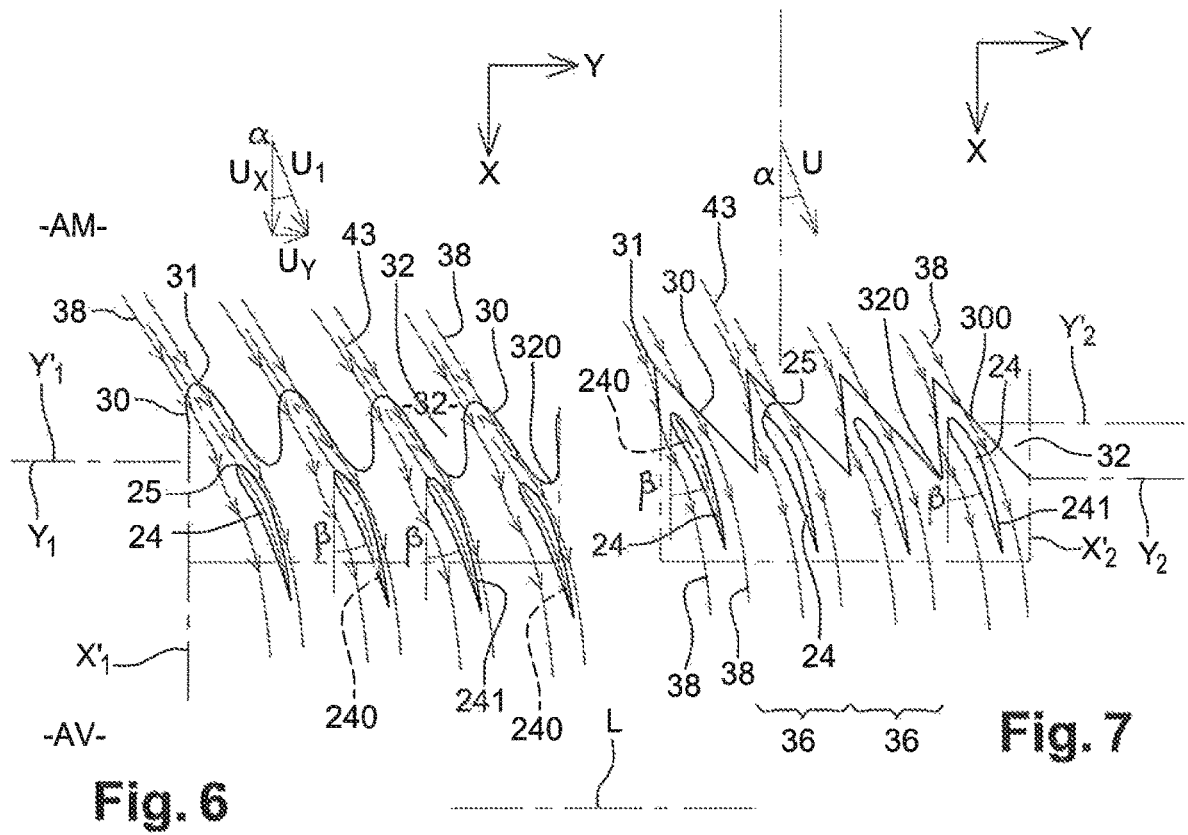
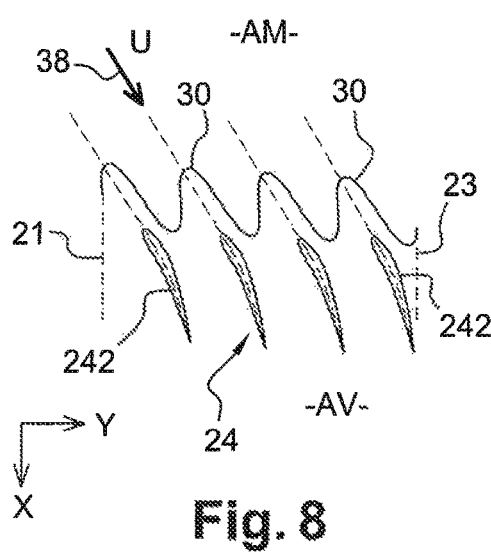
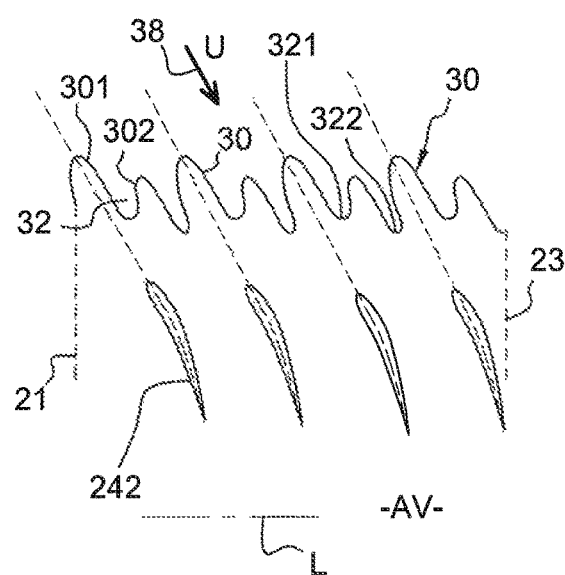

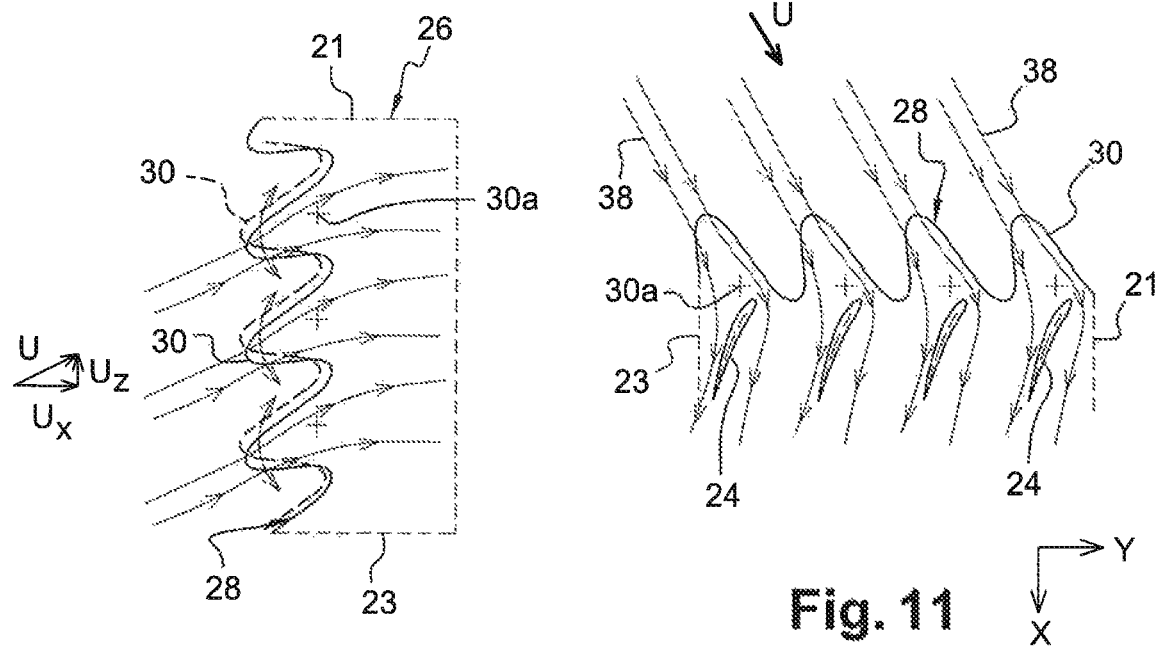
Fig. 10
Fig. 11
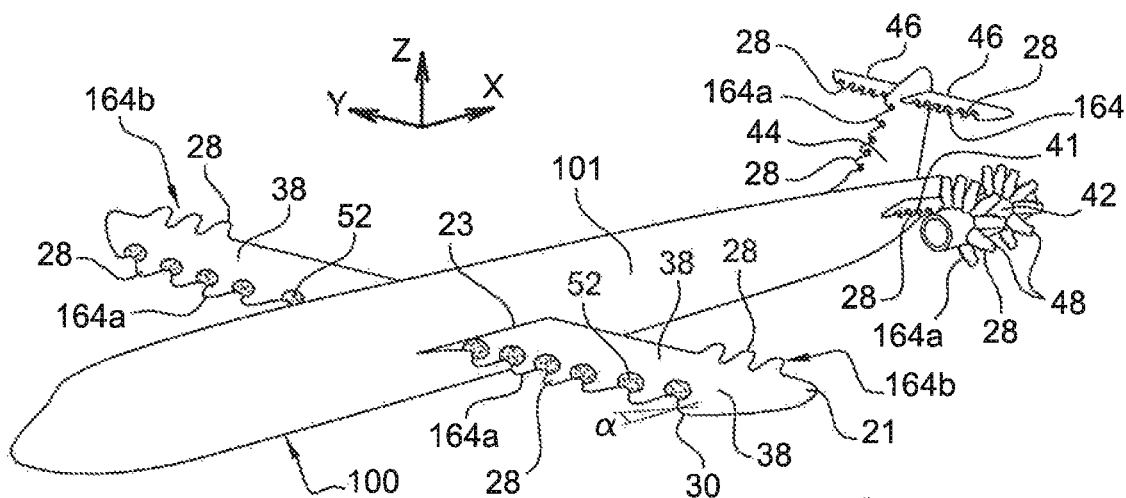
Fig. 12

TURBINE ENGINE WITH A FLOW SPLITTER HAVING A PROFILE WITH INCLINED SERRATIONS

CROSS-REFERENCE TO RELATED APPLICATIONS

This application is a continuation of U.S. patent application Ser. No. 16/969,630, filed Aug. 13, 2020, which is a national phase of PCT/FR2019/050349, filed Feb. 15, 2019, which claims the benefit of French Application No. 1851359, filed Feb. 16, 2018, the subject matter of each of which is incorporated by reference herein.

INTRODUCTION

This invention relates to the field of the aero-acoustic management of aerodynamic profiled structures such as, for example, stationary or rotating blades in an aircraft turbomachine or in a test bench for such turbomachines, or on a primary air inlet slat of the turbomachine (double-flow turbo engine in this case).

An example will be given for a double-flow turbomachine equipped with a fan (called upstream, therefore situated partly upstream of the turbomachine) and a rectifier arranged in a secondary flow and on which the above-mentioned type of fixed blade (guide vane) is found, for example, on OGV (outlet guide vanes), or rectifiers, arranged downstream of a rotating body to rectify the air flow.

On some turbo engines, it is expected to increase the diameter of the fan and reduce the length of the suspension pod fixed to the aircraft, thus reducing the distance between the fan and the inlet guide vanes of (IGV), the OGVs and the primary air inlet slat. In this type of engine, the interaction of the wake of the fan with the IGVs, the OGVs and the slat is one of the broad dominant sources of noise.

Beyond this observation in a turbomachine, other areas of turbomachines, but also aerodynamically profiled structures (wings, open-rotor blades—open rotor, etc.) are confronted with problems of aero-acoustic management.

It has therefore already been proposed, particularly in the field of aircraft, to use aerodynamically profiled structures with a profiled leading and/or trailing edge which, following a leading and/or trailing edge line, have a serration profile with a succession of teeth and depressions.

Thus, this serration profile extends along the leading and/or trailing edge, i.e. in the direction of the elongation of the structure at the leading and/or trailing edge.

Although "serration" profiles are capable of reducing the broadband noise emitted, they do have an impact on the flow around the profiles. Aerodynamic properties (aerodynamic losses, lift, boundary layer stall, etc.) can therefore be significantly affected.

In addition, the air flow generated axially (X-axis hereafter, also referred to as the general axis) downstream of a rotating structure, such as downstream of a turbomachine fan towards a primary airflow slat, or which can be influenced by a disturbing structure, such as a wing by an aircraft fuselage, or a stabiliser by a fin, is swirling and strongly influenced by a direction of rotation of the air or by that of the fan.

One goal here is to optimise the realization of serrations in order to reduce acoustic noise levels by minimizing the impact on aerodynamic properties.

A turbomachine for aircraft is therefore proposed, said turbomachine:
 having a general axis (X) about which rotating parts of the turbomachine rotate, the rotating parts including blades of a front fan,
 comprising, which have a leading edge:
  an annular airflow dividing wall for an air flow, downstream of the front fan, the annular airflow dividing wall separating the air flow into a primary and a secondary flow,
  first guide vanes (known as IGV) for guiding the primary flow (Fp) in the turbomachine, and
  second guide vanes (known as OGV) for guiding the secondary flow in the turbomachine, the first guide vanes and the second guide vanes being connected to the annular airflow dividing wall, and
 being provided with at least one profiled structure:
  having a serrated profile at the leading edge, provided with a succession of teeth and depressions, and
  such that, along the leading edge, from a first location to a second location, the teeth of the serrated profile are individually inclined towards the second location, said turbomachine being characterized in that at least one of the following characteristics a), b), c) is verified;
 a) the teeth are, circumferentially around said general axis (X) and downstream of the front fan, individually inclined (angle β below) towards a generally oblique orientation (U below) of the air flow with respect to said general axis (X), to face it generally,
 b) on the annular airflow dividing wall where they are present, said teeth are oriented in the direction of a camber line of the first guide vanes (IGV) at the leading edge,
 c) about said general axis (X), at least some of said depressions of the serrated profile are angularly offset with respect to the angular position of the first guide vanes, so that said at least some of the depressions are angularly interposed between two circumferentially successive first guide vanes.

In fact, given the geometries of the profile structures currently considered to be efficient and suitable, the teeth of the serrated profile will, individually, be favourably non-symmetrical with respect to a perpendicular to the leading edge line passing through the top of the tooth in question.

With such inclined teeth, it should be possible to take better account of the above-mentioned phenomena, so that the surfaces of the clamps can be as fully active as possible in the expected acoustic effect.

Another advantage is that it is then taken into account that the air flow generated axially downstream of the fan is swirling and is strongly influenced by the direction of rotation and speed of the fan.

Normally, at least with a profile with a periodic elementary geometry that is not excessively tortured (see above), it must be found that at a leading edge, the airflow or stream generated bypasses the profile considered at the (tops of the) teeth and accelerates near the depressions.

In this case, one advantage of having provided that, as mentioned above, at least some of the depressions are angularly interposed between two circumferentially successive first guide vanes (IGV) will be to avoid areas of turbulence and/or overspeeds that are too great at the leading edge casing area of the first guide vanes (IGV).

Furthermore, one advantage of having teeth oriented in the direction of the camber line of the IGVs at the leading edge will be the mechanical simplicity of this solution.

However, the direction of the rotating flow changes with the fan speed (i.e., engine speed).

Two interesting approaches are therefore proposed:
(a) the inclinations of the teeth are fixed at the most interesting operating regime from the aero-acoustic point of view; these inclinations, which may be common for all the teeth of the same structure, are then fixed; or
(b) on a turbomachine fitted with at least one airfoil structure as aforesaid, or an aircraft so equipped, the inclinations of the serrated airfoil teeth vary according to the engine speed of the turbomachine.

Solution (b) is technically more relevant, as it allows the inclination of the teeth to be optimised according to the operating phases of the engine and/or aircraft.

Solution (a) is mechanically simpler and its compromise can be satisfactory.

Yet another approach, which can be applied to another part of an aircraft or turbomachine, could be to provide an airfoil structure in which the wavy (or corrugated) shape would remain periodic, but would present, in at least some of the periods (successive groups of teeth), different teeth between them and/or different depressions between them.

Thus, without being mobile, the profile teeth at the leading and/or trailing edge could be more finely adapted to the complexity and variability of the air flows received.

In terms of shape, it is proposed that the teeth and depressions of the serrated profile should individually have a wavy (corrugated) shape, with rounded or more sharp tops (apexes).

Rounded tops reduce locally high concentrations of mechanical stress, thus increasing the service life of the part.

Sharp tops provide potentially increased noise reduction.

In addition, the provision of individually shaped teeth and depressions with locally rectilinear side walls makes it possible to introduce a certain decorrelation between the noise sources along the leading and/or trailing edge.

It is understood that profiled structures other than a primary air inlet spout, IGV or OGV could benefit from the considerations outlined here.

The airfoil structure could then be one of an aircraft structure (i.e. component), including an aircraft wing, an aircraft wing slat or flap, an aircraft engine support pylon, a vertical fin, an aircraft stabilizer, a helicopter blade, a propeller, a turbojet blade.

Indeed, in the above cases, the presence of such a proposed serrated profile allows to deal with a delicate problem linking static (presence of air inlet structures, blades . . . ) and dynamic (blade rotation, taking into account certain flight configurations . . . ) aero-acoustic management issues, all the more so with front fan turbomachines on which the acoustic/aerodynamic interference problems are very complex, and the generated noise is significant.

The invention will be better understood, if need be, and other details, characteristics and advantages will appear upon reading the following description given by way of a non restrictive example while referring to the appended drawings wherein:

BRIEF DESCRIPTION OF THE DRAWINGS

FIG. 1 is a longitudinal cross-sectional view (X axis) of a typical turbomachine for an aircraft;

FIG. 2 shows the upstream zone (slat) of the partition wall between the primary and secondary flows, with a solution in accordance with the invention;

FIG. 3 can be either detail III of FIG. 2, or a local serration profile diagram on what may be a helicopter blade, a blade of the fan, the rotor or the downstream guide vane, leading edge slat or aircraft wing flap;

FIG. 4 corresponds to the detail IV of FIG. 1;

FIGS. 5-9 show various forms of fixed-tooth serrated profiles according to the invention;

FIGS. 10-11 schematize a hypothesis of variable-orientation serrated tooth profiles, and FIG. 12 schematizes an aircraft bearing structures according to the invention.

DETAILED DESCRIPTION

Referring to FIG. 1, an aircraft 100 turbojet 10 is schematically represented and defined as follows:

The pod 12 is used as the outer casing for the various components, including, at the front (left in FIG. 1), a front fan 14 (located upstream: AM) whose blades turn around axis X.

Downstream (AV) of the fan 14, the airflow (locally schematised in 38 in FIG. 4) is divided by the separator slat 16 of an annular wall 160 into a primary airflow and a secondary airflow. The primary airflow flows through an internal annular air passage or primary vein 18 when entering the low-pressure compressor 22 at the inlet guide vanes IGV,24 also called first guide vanes. The secondary airflow is diverted by the separator slat 16 into an external annular air passage 20 (secondary vein) towards the outlet guide vanes OGV,26 also called secondary guide vanes, and then towards the engine outlet.

In FIG. 2, we can visualize more precisely the front part 161 of the separator slat 16, which includes the leading edge 164a located furthest upstream and at which the outer wall 162 of the separator slat 16 meets the inner wall 163 of the separator slat 16, the upper wall 162 forming the inner shell of the secondary vein 20.

For all practical purposes, in the present text, axial refers to anything extending along or parallel to the longitudinal axis (X) of rotation of the concerned part of the turbomachine, the axis being in principle the main axis of rotation of the turbomachine and the aircraft longitudinal axis, such as the one of the aircraft schematised in FIG. 12. Anything radial (axis Z) and circumferential is that which extends radially to the X axis and around it, respectively. All that is radially with respect to the X axis is internal or inner and external or outer. Thus, the inner wall 163 is the radially inner wall of the separator slat 16. Moreover, any references to upstream and downstream are to be considered in connection with the flow of gases in the (part of the) turbomachine under consideration: these gases enter upstream and exit downstream, generally circulating parallel to the X axis.

In addition, the attached drawings, and the descriptions relating to them, have been defined with reference to the conventional orthogonal reference mark X-Y-Z, with the X axis as defined above.

The separator slat 16 is hollow, the outer face of the wall 162 serving as the inner boundary to the outer annular air passage 20 receiving the secondary flow while the inner face of the wall 163 serves as the outer boundary to the inner annular air passage 18 receiving the primary flow.

The inner wall 163 of the separator slat 16 forms the outer shell of the low-pressure compressor 22.

Although the axial offset (X) downstream of the IGVs 24 from the leading edge 164a of the separator slat 16 is less than that of the OGVs 26 from the same leading edge 164a, the portion of the upstream part 161 directly adjacent to the leading edge 164a of the separator slat 16 is clear.

As explained above, for the induced effect of aero-acoustic management by limiting the noise generated by this area, this leading edge 164a can therefore be expected to have a serrated profile 28 with a succession of teeth 30 and depressions 32, as shown in the examples in FIGS. 5-6, for example.

But structures other than on a turbomachine, such as a turbojet engine 10, may be concerned by the solution of the invention and present a leading and/or trailing edge with a serrated profile 28 having a succession of teeth 30 and depressions 32 benefiting from all or part of the characteristics of the claimed invention, which characteristics would then be applied to them instead of to a turbomachine, as claimed.

FIG. 12 shows an aircraft 100 on which profiled structures with such a profile 28 with serrations are present, on the leading edge, on the wings 38, on a pylon 41 supporting an engine 42 of the aircraft, on a fin 44, a stabilizer 46, a propeller or blade 48 of a turbo engine, typically of an open rotor.

Furthermore, FIG. 3 shows a localized serration profile 28 on what may be identified as 50, a helicopter blade, a fan blade, of the rotor or the rectifier, a leading edge slat or an aircraft wing flap.

All these aerodynamic profiles have in common that they generate a boundary layer on the downstream surface, and therefore a turbulent flow.

Whatever the application, for any profile 28 with serrations, we will consider that it presents undulations that define:

along a direction (L) of elongation of the leading edge or trailing edge, an elementary geometry which repeats itself, two identical (or quasi-identical, when two consecutive teeth have small variations in geometry, to +/−30%) undulations of two successive elementary geometries, such as 34, 36 FIGS. 5, 7, along said direction L having between them, in this direction, the same distance, A, and a maximum amplitude, h, perpendicular to this direction L.

It is further specified that the L-direction is the direction along which the leading edge line extends, which can be confused with the 164a leading edge when viewed along its entire length. This direction L can be straight (e.g. in the case of a wing, daggerboard, stabiliser), or curved, or even closed in on itself (possible case of a propeller, fan blade, rotor or rectifier blade (guide vane), or the separator slat 16).

In accordance with the invention, in order to attenuate locally intense pressure fluctuations, it is therefore provided on the profile structure concerned that, along the leading edge 164a and/or trailing edge 164b (see FIG. 12) and thus the direction L of elongation, from a first location 21 to a second location 23, the teeth 30 of the serrated profile are individually inclined towards the second location: angle α FIG. 12, outside the influence of a fan, and angle β FIGS. 6-7.

FIGS. 6, 7 show a schematic representation of an above proposal that IGV 24 would be inclined in the X-Y plane with respect to the X axis; angle β. The teeth 30 are, circumferentially around this X axis, each inclined at the same angle β (but this angle could vary), in the same direction as the common IGV 24. The influence of the rotation of fan 14, which is assumed to rotate in the positive direction of the Y axis, has been taken into account here (see FIG. 1 and arrowhead in the L direction in FIG. 2).

An angle α or β between 30 and 60° to the X axis, preferably between 35 and 45°, would be appropriate, given the initial results of tests carried out. This is therefore not limiting.

Thus, both the (leading edges of the) IGV 24 and the (leading edges of the) teeth 30 are in fact generally facing the airflow 38, whose overall oblique orientation (here in relation to the X axis) U is the result of its components Ux along X and Uy along Y, taking into account the direction of rotation of the fan 14 agreed upon here.

Teeth 30 are individually axially non-symmetrical with respect to a parallel to said general axis X, this parallel again passing through the top 31 of the tooth in question.

The purpose of these guidelines can be considered to be twofold.

Firstly, to avoid the interaction between the accelerated and turbulent flow produced in depressions 32 and the leading edge 25 of the IGVs. This can indeed contribute significantly to the broadband noise of the low-pressure compressor 22. Secondly, the technical solution can be used to optimise the air inlet of the low-pressure compressor 22 and to reduce possible aerodynamic losses.

As also shown in FIGS. 6-7, these first guide vanes/IGV 24 may individually exhibit a line 240 of average camber along their chord, to account for the influence of fan 14 rotation.

The angle of inclination of the flow produced by fan 14 depends on the engine speed, i.e. the speed of the fan.

Therefore, consideration is being given to orienting teeth 30 in the direction of the average IGV camber or the camber at the leading edge 25 of these guide vanes. The angle values selected can be averaged along the wingspan or elongation of the IGVs, or take the values of the IGV camber at the blade tip, or be fixed at the operating regime of the turbomachine that is most interesting from an aero-acoustic point of view.

As illustrated and in this example, the upper surface 241 is directed in the positive Y direction, the lower surface on the opposite side.

In order to further limit the acoustic impact on the IGV 24 of the swirling air flow that the fan 14 thus generates downstream, it is also proposed, as shown in FIGS. 6-7 in particular, that the teeth 30 be, circumferentially around said general axis X, oriented globally in the direction of a tangent 43 to said line 240 of mean camber of the IGV 24 guide vanes, at the level of their leading edges 25. The tangent is at a (β) non-zero angle to the direction of the general axis (X) of the turbomachine.

An advantage is then to align the teeth 30 in the direction of the IGV camber and again to be able to adapt the geometry of the air inlet of compressor 22 to its environment. The direction of the air flow downstream of fan 12 depends on its rotation speed, so aligning the teeth in the direction of the IGVs (which are a fixed part) could be a good compromise between variable speeds and geometries to be fixed.

Along the general X axis, the teeth 30 may in particular be located upstream from the leading edges of the guide vanes IGV,24, as can be seen in FIG. 7.

However, for a dimensional limitation that may exist between the leading edge of the slat and the IGV guide vanes (typically of the order of 1-5 cm), as well as to have the possibility to increase the size/amplitude of the teeth 30, it is proposed that, still in this direction of the X axis, the bottoms 320 of the depressions 32 of the serrated profile 28 belong at least for some of them to a first surface, transverse to said X axis, marked Y1 FIG. 6 and Y2 FIG. 7, positioned at (FIG. 6) or further downstream (AV; FIG. 9) than a second surface also transverse to the X axis, marked Y'1 FIG. 6 and Y'2 FIG. 7, to which belong at least some of the leading edges 25 of the guide vanes IGV,24. In spite of the illustrations, this is a priori independent of the shape of the (tops of) teeth 30 and (bottoms 320 of the) depressions 32.

In this respect, the teeth 30 and depressions 32 of the serrated profile 28 will individually present a wavy shape, with rounded (e.g. FIG. 6, 9 or 11) or sharp (FIG. 7) tops, in order to promote effective noise reduction by minimising the mechanical stresses supported by this geometry.

As for the shapes of the side walls (one of which is marked 300 in FIG. 7) of these teeth 30 and depressions 32, they can be individually and locally presented as straight (FIG. 7), in order to favour the decorrelation of the noise sources along the leading edge and to facilitate the manufacture of this geometry.

The dotted lines in FIG. 10 schematise the fact that the inclinations of the teeth 30 of the serrated profile could vary according to the engine speed of the turbomachine and/or the phases of operation of the aircraft (typically phases of flight). In the example, this is OGV 26.

A common mechanism by pivoting the teeth 30, controlled by a control logic coupled with, for example, a servo system taking account of the engine speed, could then make it possible to vary their inclinations, along the direction of elongation L, about axes parallel to each other but perpendicular to this direction of elongation L (see one of these axes marked 30a in FIGS. 10 and 11).

Thus, as shown in FIG. 11, a geometry 28, for example of a slat with a wavy leading edge, with a variable inclination of the teeth 30, as a function of engine speed, can be achieved. This figure shows a simplified representation of the airflow lines 38 and the IGV 24 guide vanes, with orientations here "in angular opposition" between that of the IGV and that of the teeth 30: teeth 30 oriented obliquely towards side 23, IGV 24 oriented obliquely towards side 21, in this example.

Furthermore, since teeth 30 are arranged periodically along the direction of elongation L, they may all be identical, as shown in FIG. 6 or 7. However, while maintaining a profiled structure with a periodic undulating shape, it is possible, as shown in FIG. 9, to foresee (groups of) teeth (successive) 30 which, within at least some of the periods, are different from each other (see teeth 301 and 302 for example); the same applies to the depressions between them (see depressions 321 and 322 for example).

Thus, the elementary geometry will have several waves, two in the example.

Thus, without being mobile, the profile teeth could be more finely adapted to the complexity and variability of the air flows received.

Still on a slat 16, in order to benefit from favourable aerodynamics, in particular at the air inlet of the low-pressure compressor 22, it is also provided that around the X axis, at least some of the depressions 32 of the serrated profile 28 can be angularly offset (circumferentially) in relation to the angular position of the guide vanes IGV,24, so that, in the L direction, these depressions 32 are interposed between two first guide vanes IGV,24 circumferentially successive, as shown in FIGS. 8-9.

In these figures, the IGV 24 are even placed axially (X) in the continuity of teeth 30; more precisely, each chord 242 of IGV 24 has been placed, following the general direction U of the air flow 38 which impacts it, substantially in line with the top of tooth 30 which precedes this IGV, upstream (AM).

If the above explanations and comments have been made, in relation to the figures presented, mainly with reference to leading edge situations, trailing edges could be concerned, alternatively or in addition, such as (lines of) trailing edges 164b with profile 28 in wing serrations, as shown in FIG. 12.

At the trailing edge, the noise source can typically be related to the interaction between turbulence in the boundary layer of the profile and this trailing edge.

It will be understood that, in general, the solutions proposed above have had the objective(s) of optimising the orientation of the teeth of a so-called serrated aerofoil 28 to reduce the broadband noise produced by these profiles (blades, OGVs, IGVs, slats, etc.) by minimising the impact on the aerodynamic properties of the structures carrying them and/or surrounding them, particularly those located downstream.

The invention claimed is:

1. A turbomachine for an aircraft, the turbomachine comprising:
   a general axis about which rotating parts of the turbomachine rotate, the rotating parts including blades of a front fan;
   an annular airflow dividing wall for an air flow, the annular airflow dividing wall arranged downstream of the front fan and separating the air flow into a primary flow and a secondary flow;
   inlet guide vanes for guiding the primary flow in the turbomachine, each inlet guide vane having an inlet guide vane leading edge;
   outlet guide vanes for guiding the secondary flow in the turbomachine, each outlet guide vane having a leading edge, the inlet guide vanes for guiding the primary flow and the outlet guide vanes guiding the secondary flow being connected to the annular airflow dividing wall; and
   wherein at least one of the annular airflow dividing wall, the inlet guide vanes and the outlet guide vanes comprise a profiled structure having a serrated leading edge including a succession of teeth and depressions, such that, along the serrated leading edge, from a first location to a second location, the teeth of the serrated leading edge are individually inclined towards the second location,
   wherein:
   a) the teeth are, circumferentially around said general axis and downstream of the front fan, individually inclined towards a generally oblique orientation of the air flow with respect to said general axis, to generally face the air flow, or
   b) on the annular airflow dividing wall where they are present, the teeth are oriented in the direction of a camber line of the inlet guide vanes at the serrated leading edge thereof, or
   c) about said general axis, at least some of said depressions of the serrated leading edge profile are angularly offset with respect to the angular position of the inlet guide vanes, so that said at least some of the depressions are angularly interposed between two circumferentially successive inlet guide vanes, and wherein the teeth have apexes located upstream the inlet guide vane leading edge.

2. The turbomachine of claim 1, wherein the teeth and depressions of the serrated leading edge are individually wavy in shape.

3. The turbomachine of claim 2, wherein the wavy shape is periodic and has, in at least some of the periods, teeth which are different from one another and/or depressions which are different from one another.

4. The turbomachine of claim 1, wherein the teeth and depressions of the serrated leading edge individually have a shape with locally rectilinear side walls.

5. The turbomachine of claim 1, wherein the individual inclinations of the teeth of the serrated leading edge are defined according to an engine speed of the turbomachine.

6. An aircraft comprising at least one turbomachine according to claim 1.

7. The turbomachine according to claim 1, wherein the incline at a respective apex of a tooth is closer to a bottom of one adjacent depression than the other adjacent depression.

8. A turbomachine for an aircraft, the turbomachine comprising:
- a general axis about which rotating parts of the turbomachine rotate, the rotating parts including blades of a front fan;
- an annular airflow dividing wall for an air flow, the annular airflow dividing wall being arranged downstream of the front fan and separating the air flow into a primary flow and a secondary flow;
- inlet guide vanes for guiding the primary flow in the turbomachine, each inlet guide vane having an leading edge;
- outlet guide vanes for guiding the secondary flow in the turbomachine, each outlet guide vane having a leading edge; and
- wherein at least one of the inlet guide vane and the outlet guide vane comprise a profiled structure having a serrated leading edge including a succession of teeth and depressions, such that, along the serrated leading edge, from a first location to a second location, the teeth of the serrated leading edge are individually inclined towards the second location, wherein the teeth have apexes located upstream the leading edge of said at least one of the inlet guide vane and the outlet guide vane, and wherein:
- a) the teeth are, circumferentially around said general axis and downstream of the front fan, individually inclined towards a generally oblique orientation of the air flow with respect to said general axis, to generally face the air flow, or
- b) on the annular airflow dividing wall where they are present, the teeth are oriented in the direction of a camber line of the inlet guide vanes at the serrated leading edge thereof, or,
- c) about said general axis, at least some of said depressions of the serrated leading edge are angularly offset with respect to the angular position of the inlet guide vanes, so that said at least some of the depressions are angularly interposed between two circumferentially successive inlet guide vanes.

9. The turbomachine of claim 8, wherein the individual inclinations of the teeth of the serrated leading edge are defined according to an engine speed of the turbomachine.

10. The turbomachine according to claim 8, wherein the incline at a respective apex of a tooth is closer to a bottom of one adjacent depression than the other adjacent depression.

11. The aircraft comprising at least one turbomachine according to claim 8.

12. The turbomachine of claim 11, wherein the individual inclinations of the teeth of the serrated leading edge are defined according to an engine speed of the turbomachine.

13. The turbomachine according to claim 11, wherein the incline at a respective apex of a tooth is closer to a bottom of one adjacent depression than the other adjacent depression.

* * * * *